US012162616B2

(12) United States Patent
Hedrick et al.

(10) Patent No.: US 12,162,616 B2
(45) Date of Patent: *Dec. 10, 2024

(54) PILOT INTERFACE FOR AIRCRAFT AUTOTHROTTLE CONTROL

(71) Applicant: Innovative Solutions & Support, Inc., Exton, PA (US)

(72) Inventors: Geoffrey S. M. Hedrick, Malvern, PA (US); Markus Knopf, Chester Springs, PA (US); Shahram Askarpour, Downington, PA (US)

(73) Assignee: INNOVATIVE SOLUTIONS & SUPPORT, INC., Exton, PA (US)

(*) Notice: Subject to any disclaimer, the term of this patent is extended or adjusted under 35 U.S.C. 154(b) by 290 days.

This patent is subject to a terminal disclaimer.

(21) Appl. No.: 17/675,534

(22) Filed: Feb. 18, 2022

(65) Prior Publication Data

US 2022/0258872 A1 Aug. 18, 2022

Related U.S. Application Data

(60) Provisional application No. 63/167,424, filed on Mar. 29, 2021, provisional application No. 63/150,788, filed on Feb. 18, 2021.

(51) Int. Cl.
*B64D 31/06* (2024.01)
*B64D 31/04* (2006.01)
(Continued)

(52) U.S. Cl.
CPC ............ *B64D 31/06* (2013.01); *B64D 31/04* (2013.01); *B64D 31/08* (2013.01); *B64D 43/00* (2013.01); *G05D 1/0661* (2013.01)

(58) Field of Classification Search
CPC ........ B64D 31/06; B64D 31/04; B64D 31/08; B64D 43/00; G05D 1/0661
See application file for complete search history.

(56) References Cited

U.S. PATENT DOCUMENTS 3,199,368 A * 8/1965 Funk ...................... B64D 31/04
74/105
3,199,811 A * 8/1965 Brainerd ................ B64D 31/06
244/76 R (Continued)

OTHER PUBLICATIONS

Notice of Allowance dated Mar. 15, 2023 issued in U.S. Appl. No. 17/941,714.

(Continued)

*Primary Examiner* — Dale W Hilgendorf
(74) *Attorney, Agent, or Firm* — Cozen O'Connor

(57) ABSTRACT

An autothrottle for an aircraft that includes a power-control input (PCL) manually movable by a pilot along a travel path to effect a throttle setting that controls engine power of the aircraft. The autothrottle determines a control-target setting for a throttle of the aircraft and dynamically adjusts the throttle according to the control-target setting, including moving the PCL to achieve the control-target setting. A virtual detent is set and dynamically adjusted at positions along a travel path of the PCL corresponding to the control-target setting. The virtual detent is operative, at least when the autothrottle is in a disengaged state for autothrottle control, to indicate the control-target setting to the pilot via a haptic effect that applies a detent force opposing motion of the PCL in response to the PCL achieving the position of the virtual detent.

21 Claims, 8 Drawing Sheets

(51) Int. Cl.
*B64D 31/08* (2006.01)
*B64D 43/00* (2006.01)
*G05D 1/00* (2024.01)

(56) References Cited

U.S. PATENT DOCUMENTS

| | | | | |
|---|---|---|---|---|
| 4,494,061 A * | 1/1985 | Kaye | ............... | B64D 31/04 |
| | | | | 318/135 |
| 4,651,954 A * | 3/1987 | Miller | ............... | B64D 31/06 |
| | | | | 244/76 R |
| 5,039,037 A * | 8/1991 | DeLuca | ............... | G05D 1/0061 |
| | | | | 244/175 |
| 5,188,316 A * | 2/1993 | Dressler | ............... | B64D 31/02 |
| | | | | 244/236 |
| 5,403,155 A * | 4/1995 | Head | ............... | B64C 27/56 |
| | | | | 244/236 |
| 8,844,880 B1 * | 9/2014 | Corliss | ............... | B64C 27/32 |
| | | | | 244/234 |
| 9,696,724 B1 * | 7/2017 | Arons | ............... | G05D 1/0202 |
| 10,737,799 B2 * | 8/2020 | Hedrick | ............... | G08G 5/0008 |
| 11,027,854 B2 * | 6/2021 | Hedrick | ............... | G05D 3/12 |
| 11,634,236 B2 * | 4/2023 | Hedrick | ............... | B64D 43/00 |
| | | | | 701/3 |
| 2016/0207633 A1 * | 7/2016 | McWaters | ............... | B64D 43/00 |
| 2017/0259931 A1 * | 9/2017 | Martindale | ............... | B64D 43/02 |
| 2019/0047715 A1 * | 2/2019 | Hedrick | ............... | G08G 5/04 |
| 2019/0176997 A1 * | 6/2019 | Lambton | ............... | B64D 31/06 |
| 2020/0130855 A1 * | 4/2020 | Zingaro | ............... | B64D 31/08 |
| 2021/0371083 A1 * | 12/2021 | Lambton | ............... | B64C 13/04 |
| 2021/0403170 A1 * | 12/2021 | Hedrick | ............... | B64D 31/06 |
| 2022/0258872 A1 * | 8/2022 | Hedrick | ............... | B64D 43/00 |
| 2022/0372922 A1 * | 11/2022 | Eddy | ............... | B64D 31/04 |

OTHER PUBLICATIONS

Search Report with Written Opinion dated Jun. 30, 2022 issued in PCT/US2022/017001.
Office Action dated Nov. 29, 2022 issued in related U.S. Appl. No. 17/941,714.
Invitation to Pay Fees with Partial Search Report dated May 19, 2022 issued in International Patent Application No. PCT/US2022/017001.

* cited by examiner

PILOT INTERFACE FOR AIRCRAFT AUTOTHROTTLE CONTROL

PRIOR APPLICATION

This Application claims the benefit of U.S. Provisional Application No. 63/150,788, filed Feb. 18, 2021, and U.S. Provisional Application No. 63/167,424, filed Mar. 29, 2021, the disclosures of which are both incorporated by reference herein.

TECHNICAL FIELD

The invention relates generally to aeronautics and aircraft control and, more particularly, to automatic throttle control for reducing pilot workload and maintaining safe flight characteristics.

BACKGROUND

Automatic throttle systems for aircraft, commonly referred to as autothrottles, are systems that control an aircraft's engines with minimal pilot intervention. Such autothrottles provide the ability to realize truly automated, hands-off control of the aircraft, thus providing increased aircraft operating efficiencies, reducing cost in, for example, the consumption of fuel, and vastly decreasing pilot workload and thereby notably increasing flight safety. Autothrottles are ubiquitous on large or sophisticated high-end aircraft, such as airline passenger jets, advanced regional and general aviation jets, and advanced turbine-propeller airplanes, which generally incorporate an autothrottle as part of a comprehensive flight management system (FMS). The FMS also provides autopilot control with lateral navigation (LNAV) and vertical navigation (VNAV), which may control the aircraft along its flight plan and maintain its operation within a safety envelope. FMS' s are comprehensive systems that are fundamentally integrated into the aircraft by the aircraft's manufacturer, and comprise a variety of sensors and actuators throughout the aircraft to assess the aircraft's configuration, position, orientation, speed, altitude, and performance, among other monitored parameters.

Due to the complexity and cost of FMS's, such systems have traditionally been considered impractical for smaller aircraft, such as those used for general aviation. Small aircraft may include aircraft with single or multiple engines using pistons or turbines (e.g., light aircraft or very light jet (VLJ)), and which generally accommodate 10 or fewer passengers. Typically small aircraft have a maximum takeoff weight (MTOW) of under 15,000 pounds (6,800 kg). Although small aircraft may include disparate systems such as an autopilot, GPS-based navigation, and others, such systems tend to be offered as options by aircraft manufacturers, or retrofitted to an existing aircraft, and hence are generally not integrated into a complete FMS. Also, certain sensors used by an FMS, such as a radar-based altimeter, redundant airspeed sensors, and the like, are typically absent from small aircraft, further complicating the addition of an FMS.

Likewise, autothrottle systems have traditionally been implemented in only large or technologically-advanced aircraft (e.g., which have FMS's) because traditional autothrottle systems generally require physical, spatial, and other accommodations are not available on small aircraft. In most aircraft, the throttle(s)—which are selectively adjustable to cause the engine(s) to generate a predetermined amount of power or thrust—are adjusted by pilot-controlled manual override displacement of one or more graspable handles on levers that are commonly mounted in the aircraft cockpit or flight control deck and movable along a linear or an arcuate path. These levers are operatively coupled to the engines or engine controller(s).

In almost any aircraft, not insignificant forces must be applied to the throttle levers—whether manually by a pilot or by an operating motor of an autothrottle system—to vary or adjust the positions of the levers. The motors of the system, therefore, must be fairly robust, both in size and weight (to provide sufficient torque and operating forces applied to the power control lever(s) (PCL)) and in construction (to assure continued reliability through tens of thousands of activations and operations). As a consequence, only aircraft specifically designed and constructed with sufficient clearances and space to accommodate such motors and associated elements at, in, or alongside the throttles within the cockpit, and capable of accepting the significant additional weight associated with these systems and their component parts, are able to incorporate such autothrottles into and with their flight controls. Traditionally, there has been no ability to retrofit or add autothrottle capabilities into existing aircraft that have not already been specially designed and constructed to accommodate the associated operating components of an autothrottle system.

U.S. Pat. No. 11,027,854 to Hedrick, entitled "Precision Operator for an Aircraft Autothrottle or Autopilot System with Engine Performance Adjust," the disclosure of which is incorporated by reference herein, describes an autothrottle system that is compact, lightweight, reliable and readily installable in an aircraft, even in small aircraft without any special accommodation for adding or providing conventional autopilot/autothrottle capabilities. The autothrottle system includes a motor that is mechanically coupled to the aircraft's PCL via a clutchless interconnect that allows the motor to move the PCL in response to commands issued by an autothrottle controller when the autothrottle system is engaged, while also allowing the pilot to manually overpower the motor-driven motion of the PCL without first disengaging the autothrottle.

Although the technology described in the Hedrick patent, or in other such technology relating to autothrottle systems for small aircraft, may provide important and practical solutions to a number of challenges previously encountered in implementing autothrottles, there remains a need to further improve the pilot interface with the autothrottle system to make its operation more intuitive, simple, and safe. This need becomes increasingly pressing considering the ongoing advancements in the functionality of autothrottle systems.

SUMMARY OF THE DISCLOSURE

One aspect of this disclosure is directed to a system for controlling an autothrottle of an aircraft that includes, a power-control input (PCL) manually movable by a pilot along a travel path to effect a throttle setting that controls engine power of the aircraft. The system includes an autothrottle controller including processing circuitry, memory, and input/output facilities, with the autothrottle controller being operative to execute instructions including a user-interface process and an autothrottle control program. An autothrottle actuator is mechanically coupled to the PCL and is operative to set and dynamically adjust the PCL in response to an output of the autothrottle controller. The autothrottle control program, when executed, causes the autothrottle controller to determine a control-target setting and to command the autothrottle actuator to set and dynamically adjust the PCL according to the control-target setting when the system is in an engaged state for autothrottle control. The user-interface process, when executed, causes the autothrottle controller to set and dynamically adjust a virtual detent, the virtual detent being located at a position along the travel path of the PCL corresponding to the control-target setting. The virtual detent is operative, at least when the system is in a disengaged state for autothrottle control, to indicate the control-target setting to the pilot via a haptic effect that applies a detent force opposing motion of the PCL in response to the PCL achieving the position of the virtual detent.

Another aspect is directed to a system for controlling an autothrottle of an aircraft, the system comprising an autothrottle controller that is operative to execute instructions including a user-interface process and an autothrottle control program. An autothrottle actuator sets and dynamically adjusts a throttle setting that controls engine power of the aircraft in response to an output of the autothrottle controller. An autothrottle activation input device, an autothrottle mode input device, and a display device are all operatively coupled to the autothrottle controller. The autothrottle control program, when executed, causes the autothrottle controller to determine a control-target setting and to command the autothrottle actuator to set and dynamically adjust the throttle setting according to the control-target setting when the system is in an engaged state for autothrottle control. The user-interface process, when executed, causes the autothrottle controller to respond to actuation of the autothrottle activation input device by toggling between the engaged and the disengaged states; respond to actuation of the autothrottle mode input device by switching between different ones of a plurality of autothrottle control modes; and display information indicative of a selected one of the plurality of autothrottle control modes on the display device.

A further aspect is directed to an autothrottle system with an autothrottle controller operative to execute instructions including an autothrottle control program, and an autothrottle actuator to set and dynamically adjust a throttle setting that controls engine power of the aircraft in response to an output of the autothrottle controller. The autothrottle control program, when executed, causes the autothrottle controller to command the autothrottle actuator to set and dynamically adjust the throttle setting according to different ones of a plurality of autothrottle control modes, where each of the autothrottle control modes defines a corresponding control-target setting. Further, the program causes the autothrottle to autonomously transition from one of the autothrottle control modes to another one of the autothrottle control modes in response to a determination by the autothrottle controller that mode-transition criteria has been met.

A method according to a related aspect of this disclosure is for controlling an autothrottle of an aircraft that includes, a PCL. The method includes: determining, by an autothrottle controller a control-target setting for a throttle of the aircraft; dynamically adjusting the throttle according to the control-target setting, including moving the PCL to achieve the control-target setting when the autothrottle is in an engaged state for autothrottle control; and setting and dynamically adjusting a virtual detent, the virtual detent being located at a position along a travel path of the PCL corresponding to the control-target setting, wherein the virtual detent is operative, at least when the autothrottle is in a disengaged state for autothrottle control, to indicate the control-target setting to the pilot via a haptic effect that applies a detent force opposing motion of the PCL in response to the PCL achieving the position of the virtual detent.

In another method as described herein, an autothrottle controller performs the following operations: determining a control-target setting for a throttle of the aircraft; dynamically adjusting the throttle according to the control-target setting when the autothrottle is in an engaged state for autothrottle control; and reading input from an autothrottle activation input device; reading input from an autothrottle mode input device; responding to actuation of the autothrottle activation input device by toggling between the engaged and the disengaged states; and responding to actuation of the autothrottle mode input device by switching between different ones of a plurality of autothrottle control modes.

A further method for controlling an autothrottle of an aircraft includes: autonomously, dynamically adjusting a throttle setting according to different ones of a plurality of autothrottle control modes, where each of the autothrottle control modes defines a corresponding control-target setting; and autonomously transitioning from one of the autothrottle control modes to another one of the autothrottle control modes in response to a determination that mode-transition criteria has been met.

Related aspects of the subject matter include instructions (stored on at least one tangible, non-transitory machine-readable medium) that are executable on a controller of an autothrottle system to perform the operations according to any of the methods described herein.

A number of advantages will become apparent from the following Detailed Description.

BRIEF DESCRIPTION OF THE DRAWINGS

The invention may be more completely understood in consideration of the following detailed description of various embodiments of the invention in connection with the accompanying drawings.

Figure 1:
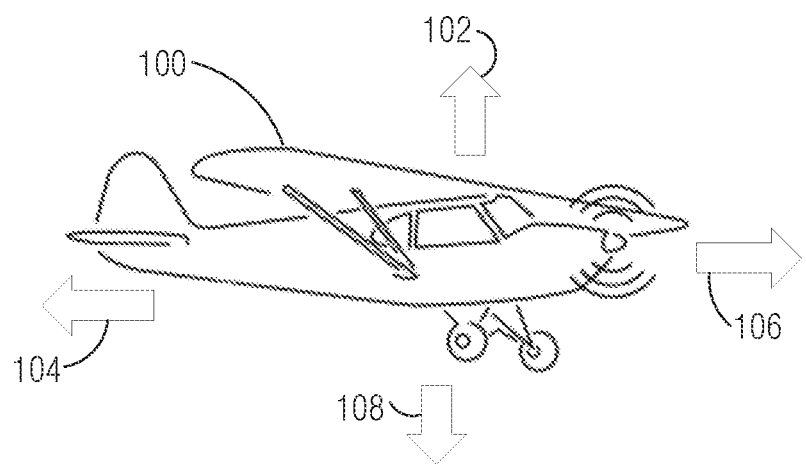
FIG. 1 is a simplified diagram illustrating an aircraft and basic forces involved in its flight.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

It should be noted that aspects of this disclosure are applicable in any powered aircraft, including traditional fuel-burning aircraft (propeller-driven, turboprop, jet, or other), electric aircraft (battery-, solar-, or fuel cell-powered), or hybrid-powered aircraft. In the following description, various embodiments are described in the context of one, or some, types of propulsion or propulsion-energy-delivery systems; however, it should be understood that principles of the described embodiments may be suitably applied to other types of aircraft having other propulsion or propulsion-energy-delivery systems with suitable adaptation which is within the skill of aircraft technologists.

FIG. 1 is a simplified diagram illustrating aircraft 100 and basic forces involved in its flight. Aircraft 100 generates lift 102 from its forward motion by directing air downward using primarily the shape and orientation of the body of aircraft 100 (e.g., its wings, fuselage, and control surfaces). Lift also depends on the density of the air, the square of the velocity, the air's viscosity and compressibility, the surface area over which the air flows. The dependence on body shape of aircraft 100 is complex and difficult to model mathematically. The effect of inclination of aircraft 100, air viscosity (e.g., due to air temperature, humidity, and altitude), and compressibility on the lift is variable and also difficult to derive for a given operating condition.

Drag 104 is a force that resists the forward motion of aircraft 100. Drag 104 has a number of components, such as aerodynamic friction between the air and the surface of aircraft 100 (skin friction), aerodynamic resistance to the motion of the aircraft 100 through the air (form drag), and drag caused by lift (induced drag), among others, which are likewise difficult to account for in order to compute drag predictively. Like lift 102, drag 104 depends on a number of complex factors, including the size, shape, and weight of aircraft 100, the surface properties of aircraft 100, fluid characteristics of the air, and other parameters. Notably, different parameters of drag 104 prevail at different airspeeds. At low airspeeds, a primary component of drag 104 is the induced drag. As aircraft 100 increases its airspeed, lift 102 is generated more easily, and the induced drag actually reduces. However, with increasing airspeed, the other drag components, collectively referred to as parasitic drag, increase.

Thrust 106 is the propulsion force generated by aircraft 100 to overcome drag 104. Generation of thrust requires consumption of fuel or other onboard energy source (e.g., electrical charge in the case of battery-powered aircraft). The magnitude of the thrust depends on a number of parameters relating to the propulsion system of aircraft 100, such as the type and quantity of engines, and the throttle setting(s). Weight 108 is a combination of gravity and the mass of aircraft 100, including the mass of the airframe, plus the mass of the fuel (which is a time-varying quantity in the case of fuel-consuming aircraft), plus any payload on board aircraft 100 (people, freight, etc., which may also be dynamically-varying as in the case of air-dropping operations). The dynamic variability of weight 108 means that the amounts of lift 102 and drag 104 also vary over time during the flight of aircraft 100.

The performance of aircraft 100 is limited by various physical constraints. For instance, the airspeed is practically limited by the aerodynamics and structural strength of the airframe of aircraft 100, as well as by the available thrust. Also, there are limits to the power, thrust, or torque that the engine(s), shaft(s), propellers, and other associated components can withstand. Likewise, the engine(s) are limited by the temperature at which the engine components or fluids may be operated. Such various constraints and are typically represented as maximum ratings provided by the engine manufacturer.

During the operation of aircraft 100, different constraints dominate the aircraft's performance limitations depending on the phase of flight, air density and temperature, and other parameters. For instance, during takeoff and climb, the performance of aircraft 100 tends to be limited primarily by the maximum engine power, thrust, or torque, whereas during cruise, the performance of aircraft 100 tends to be limited by engine temperature.

Because of the complexity and variability of the forces of both, lift 102 and drag 104, it is difficult for the pilot of aircraft 100 to maintain the optimal throttle setting, accounting for the current altitude, weight, and conditions of the air, in order to take off, climb, or cruise at the desired operating point, which may be, for example:

the point of maximum power, thrust, or torque in takeoff or climb phases;
the point of maximum temperature during cruise; or
the point of maximum efficiency for maximum-endurance flight.

According to some embodiments, an autothrottle control system is employed in an aircraft to dynamically determine a suitable PCL setting, which may correspond to a set operating point for the current phase of flight. The operating point may be set and varied by the pilot using an interface of the autothrottle system that includes the PCL. Also, the operating point may be automatically adjusted by the autothrottle system to maintain a safe flight envelope.

In a related aspect, the interface of the autothrottle system utilizes certain specialized controlled behaviors of the PCL to effect a haptic indication. For instance, a virtual detent, or stopping point, of the PCL, as described in detail below, is implemented by the autothrottle system to indicate a PCL set point to the pilot.

In another related aspect, a simple set of input devices, such as switches, pushbuttons, or the like, accompany the PCL to facilitate pilot control of the autothrottle, including an input to set the autothrottle control mode, and an input to set or change the virtual detent position.

In some implementations, aspects of this disclosure may be implemented in conjunction with an autothrottle arrangement such as one shown and described in U.S. Pat. No. 11,027,854, the disclosure of which is incorporated by reference herein, may be utilized. In other implementations, other suitable autothrottle arrangements may be used to implement aspects of the present disclosure.

Figure 2:
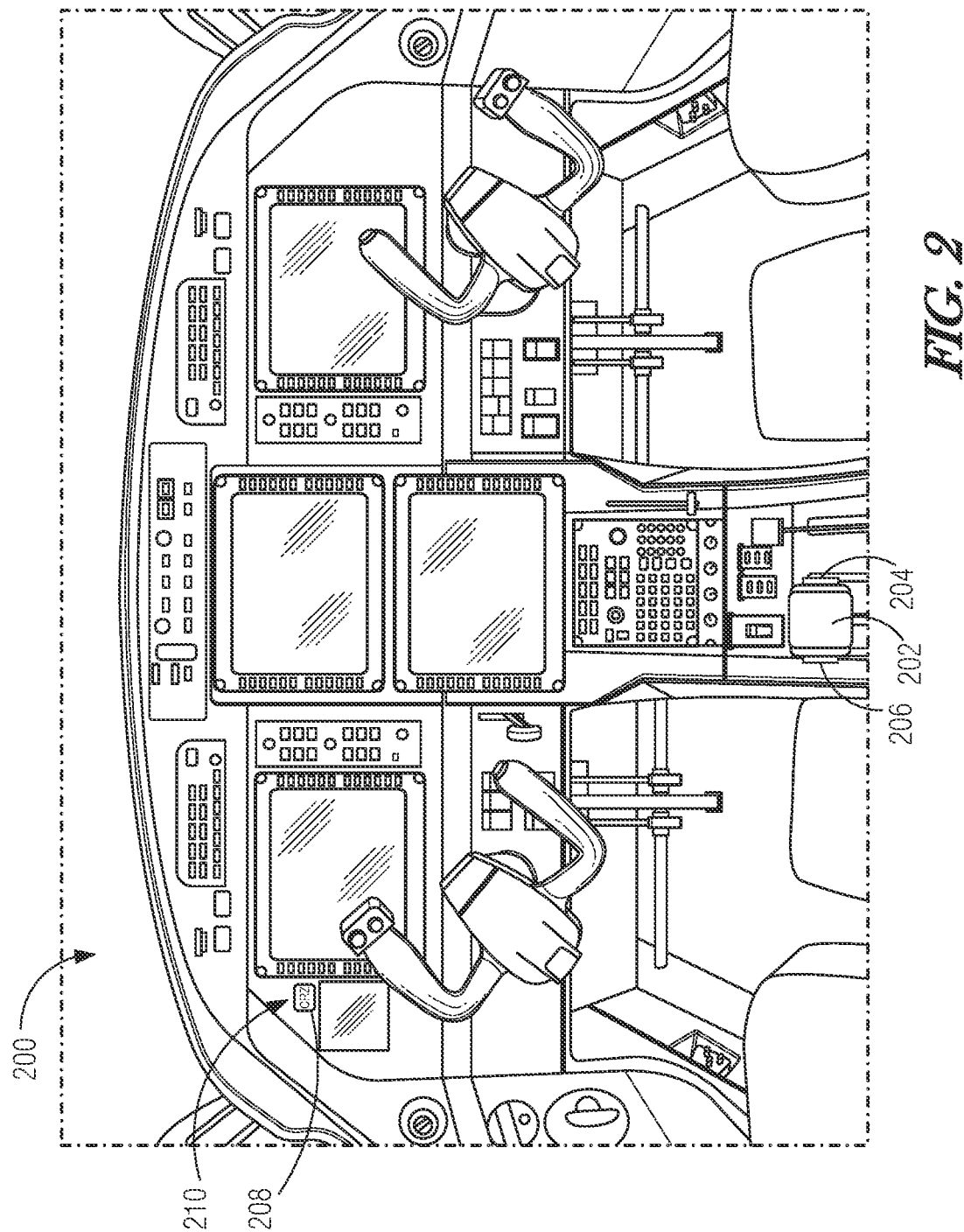
FIG. 2 is a diagram illustrating a cockpit or flight deck of an aircraft, in which autothrottle controls are implemented in accordance with some embodiments of this disclosure.

FIG. 2 is a diagram illustrating a cockpit or flight deck 200 (these terms may be used interchangeably in the present context) of an aircraft, such as aircraft 100, in which autothrottle pilot-interface controls are implemented in accordance with some embodiments of this disclosure. Cockpit 200 includes PCL 202 which, in this example, is pivotably mounted in the center console, and movable in the forward and aft directions along an arcuate travel path.

PCL 202 may be a single lever, as shown in the example illustrated, or it may comprise multiple levers (not shown) in the case of a multi-engine aircraft. For simplicity, this description will refer to one or more power-control levers simply as the "PCL," unless specific reference to multiple levers is intended. In a more general embodiment, rather than a lever, a power-control input may be provided in a different form. For example, a power control input may be implemented as at least one slider, knob, wheel, pedal, or other pilot-actuatable mechanism (or set of mechanisms). Here, too, for the sake of brevity, the power-control input (in whichever form it may be) is referred to simply as a "PCL."

PCL 202 is coupled, via a suitable operative coupling arrangement, to the respective engine(s) and fuel-delivery system(s) of aircraft 100. For example, the operative coupling arrangement may be a mechanical system that regulates the engine power based on the positioning of the respective power-control lever(s). The engine power may be varied by varying the flow of fuel or combustion air to the engine(s). In another example, as in the case of a fly-by-wire arrangement, the operative coupling may include an electrical system that carries command signaling from the PCL to an actuator that regulates the engine power (e.g., flow of fuel or combustion air or, in the case of electric aircraft, the delivery of electrical power to the engine(s)) based on the settings provided into the PCL.

PCL 202 is also coupled to an autothrottle actuator (not shown). The autothrottle actuator, and its coupling to PCL 202 may be implemented as described in U.S. Pat. No. 11,027,854, or they may be implemented in other suitable ways. Notably, the autothrottle actuator is arranged to move PCL 202 in accordance with the autothrottle control when the autothrottle system is engaged, while also permitting the pilot to move PCL 202 while the autothrottle system is engaged. The autothrottle system is further arranged to detect and monitor the position of PCL 202, as described in U.S. Pat. No. 11,027,854, or by other suitable sensing means. Therefore, PCL 202 serves as a portion of the autothrottle pilot-interface controls.

The example depicted in FIG. 2 illustrates additional autothrottle pilot-interface controls, namely, autothrottle activation control 204, takeoff/go around control 206, and autothrottle mode selector 208. These controls 204-208 are implemented as momentary pushbutton switches according to the embodiment depicted. However, in other embodiments, controls 204-208 may be implemented using other types of input mechanisms, such as selector knob(s), rocker switches, multi-position selector switch(es), toggle switch(es), push-on/push-off switch(es), soft-key controls (e.g., via touchscreen), or the like.

In addition, autothrottle mode display 210 is provided. Autothrottle mode display 210 may include LED or LCD segments, a matrix of LED or LCD devices, or other suitable display technology, along with display-decoder or driver circuitry, which interfaces the display device with an autothrottle controller (described below). In the example depicted, autothrottle mode display 210 is integral with autothrottle mode selector 208 such that information is displayed on the pilot-facing surface of autothrottle mode selector 208. In other embodiments, autothrottle mode display 210 is separate from autothrottle mode selector 208, and may be placed elsewhere in the control panel of cockpit 200. In still other embodiments, autothrottle mode display 210 is implemented using a general-purpose information display present in cockpit 200, such as an instrument display or navigation display screen, or as part of the information displayed on a heads-up display.

Figure 3:
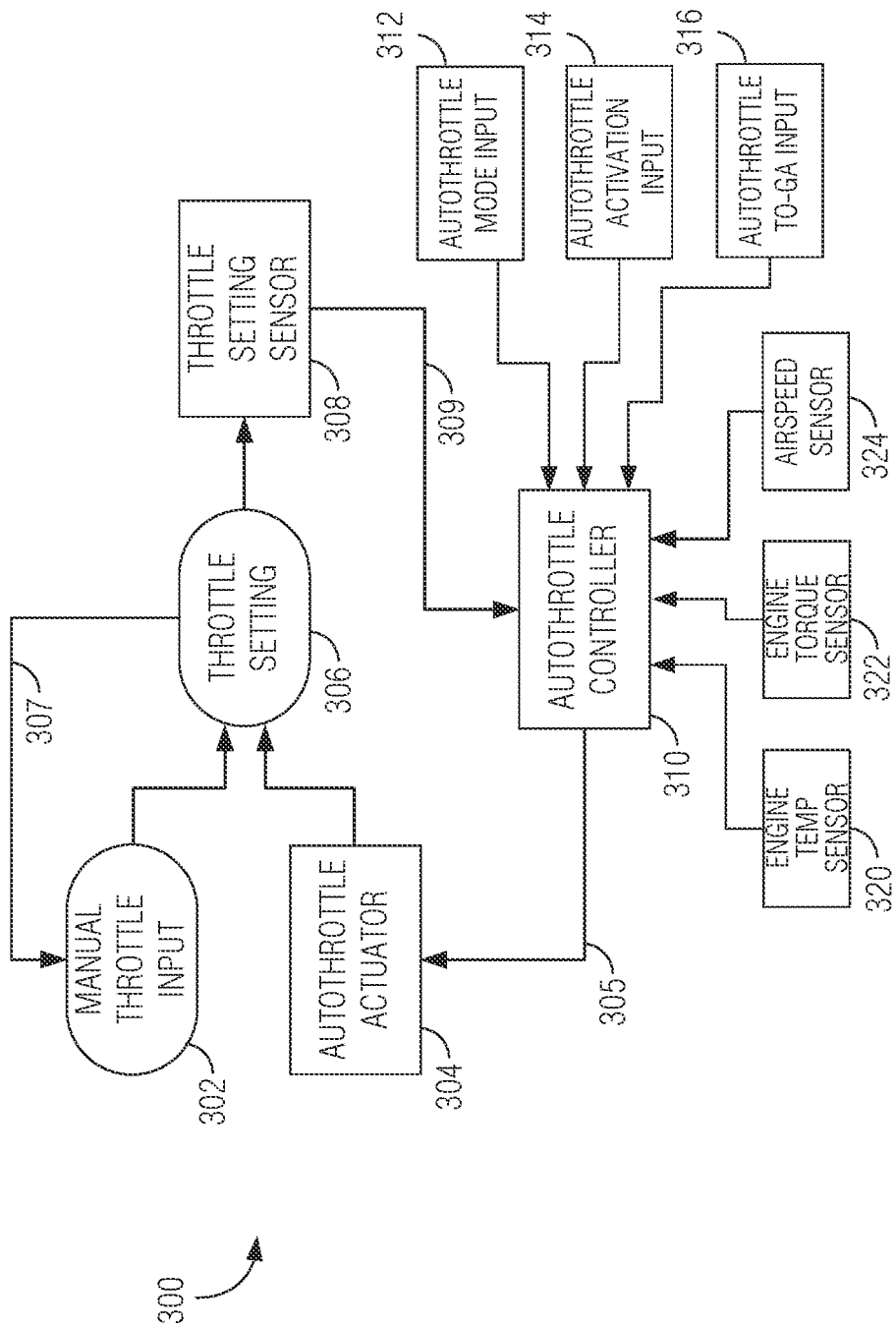
FIG. 3 is a block diagram illustrating an autothrottle control system according to some embodiments.

FIG. 3 is a block diagram illustrating an autothrottle control system 300 according to some embodiments. As depicted, system 300 includes manual throttle input 302, which may take the form of a PCL, such as PCL 202, or other type.

Autothrottle actuator 304 is a parallel subsystem to manual throttle input 302. Autothrottle actuator 304 automatically regulates the engine power based on command signaling 305 that is generated by autothrottle controller 310. In one example, autothrottle actuator 304 comprises a motor and motor controller, such as a servo motor system, with the rotor of the motor mechanically coupled to manual throttle input 302. In another example, autothrottle actuator 304 is an actuator coupled to the engine(s) or fuel system of aircraft 100, and may include one or more valves for controlling a flow rate of fuel of combustion air to the engine(s). In another example, autothrottle actuator 304 includes one or more switches, transmission gates, or signal amplifiers interfaced with an engine control system of aircraft 100.

Manual throttle input 302 and the output of autothrottle actuator 304 combine to produce throttle setting 306, which is provided as the engine-power input to the engine(s) and fuel system as applicable. The combination of manual throttle input 302 and the output of autothrottle actuator 304 may be achieved mechanically, electromechanically, or electronically, according to various implementations.

In some embodiments, when autothrottle is engaged, autothrottle actuator 304 controls throttle setting 306 in the absence of manual throttle input 302; however, manual throttle input 302, when present, overrides autothrottle actuator 304 to control throttle setting 306. In other embodiments, throttle setting 306 may implement a different combination of manual throttle 302 and autothrottle 304 when both inputs are supplied simultaneously. For instance, autothrottle actuator 304 may be provided to throttle setting 306 as a relatively lower-weighted input, whereas manual throttle input 302 may be provided as a relatively higher-weighted input. In related implementations, a sufficient force is needed at manual throttle input 302 to override autothrottle actuator 304. In other related implementations, throttle setting 306 provides a mechanical force or electronic signal as feedback 307 to manual throttle input 302, such that the effect of autothrottle actuator 304 may be felt or otherwise observed by the pilot at manual throttle input 302.

Throttle setting sensor 308 is arranged to detect the state of throttle setting 306, and provide signal 309 representing that detected state to autothrottle controller 310. Notably, signal 309 represents the effect of manual throttle input 302 on throttle setting 306 when manual throttle input 302 is asserted. In some embodiments, throttle setting sensor 308 is not necessary and may be omitted, for instance, when throttle setting 306 is output as an electronic signal (in which case throttle setting 306 may be fed directly to autothrottle controller 310). Throttle setting sensor 308 may be utilized in embodiments where throttle setting 306 is realized as a mechanical force or motion (such as movement or positioning of a power-control lever, or movement or positioning of a throttle-control cable or associated linkage).

Autothrottle controller 310 produces command signaling 305 for the control of autothrottle actuator 304 based on a plurality of inputs. Autothrottle mode input 312 is provided by the pilot of aircraft 100 via autothrottle mode selector 208, and includes such parameters as engagement/disengagement of autothrottle controller 310, and selection from one or more available autothrottle programs that define the behavior or operational objective of the autothrottle.

Other inputs to autothrottle controller 310 may include autothrottle activation input 314, and autothrottle TO-GA command input 316. Autothrottle activation input 314 is provided via autothrottle activation control 204, and is operable by the pilot in various patterns (e.g., short press/ long press) to select between engaged and armed states of the autothrottle control, as well as to completely disengage the autothrottle to a disarmed state. Autothrottle takeoff/go around (TO-GA) input is provided via takeoff/go around control 206, and is operable by the pilot to place the autothrottle in a takeoff autothrottle program when aircraft 100 is on the ground, or to place the autothrottle in a climb (go-around) program when aircraft 100 is in the air. Additional functions may be assigned to inputs 312-316, which may be actuated individually, or in combination with throttle input 302 via PCL 202. For instance, autothrottle activation input 314 may be further activated in a certain pattern (e.g., double-press) by the pilot to toggle between coarse or fine speed adjustment of the autothrottle. Likewise, actuation of autothrottle activation input 314 in conjunction with positioning of PCL 202 may be used by the pilot to set or re-set an autothrottle control-target setting.

Autothrottle controller 310 may also receive various inputs from sensors, such as engine temperature sensor 320, engine torque sensor 322, and airspeed sensor 324, along with other available sensors on aircraft 100, such as altimeter, fuel-consumption-rate sensor, etc.

Figure 4:
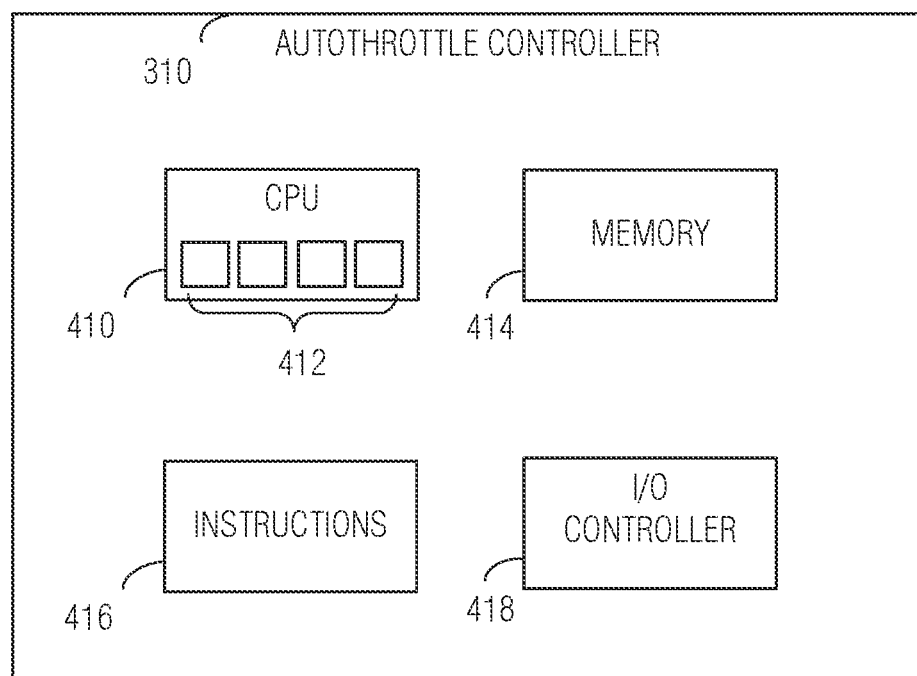
FIG. 4 is a simplified block diagram illustrating components of autothrottle controller according to an example implementation.

FIG. 4 is a simplified block diagram illustrating components of autothrottle controller 310 according to an example implementation. Autothrottle controller 310 includes central processing unit (CPU) 410, which may include one or more processor cores 412. Memory circuitry 414 may include static or dynamic random-access memory (RAM) and a memory controller circuit interfaced with CPU 410. Instructions 416 may be stored on a read-only memory (ROM) device, or an electrically-erasable programmable read-only memory (EEPROM) device such as a flash EEPROM device interfaced with CPU 410 or the memory controller circuit of memory 414. Input/output (I/O) controller 418 includes interfaces to the various inputs and command signaling output 305 described above. In some implementations, I/O controller 418 may include a universal asynchronous receiver/transmitter (UART) for serial communications, a parallel port, analog-to-digital (A/D) converter, or a digital-to-analog converter (D/A). I/O controller 418 may be interfaced with CPU 410 or memory controller of memory 414.

Figure 5:
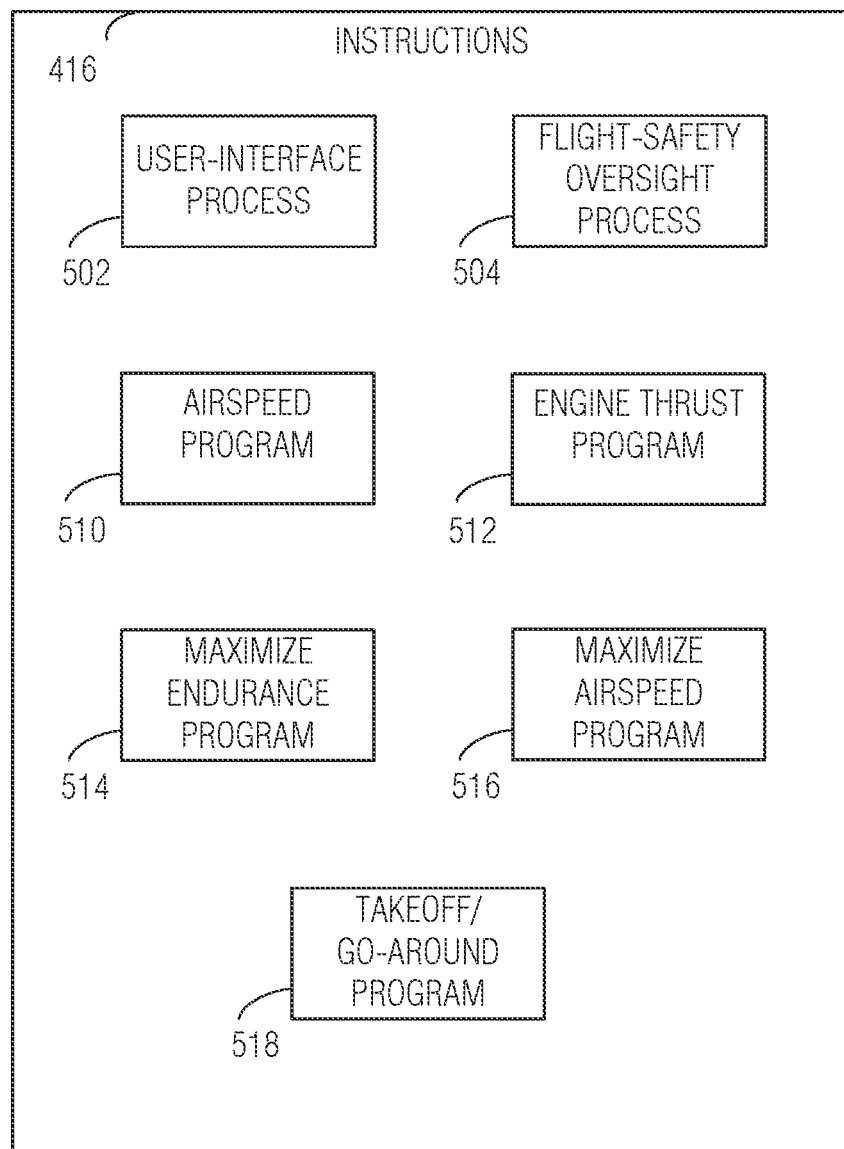
FIG. 5 is a simplified block diagram illustrating portions of certain instructions executable by the autothrottle controller according to some examples.

Autothrottle controller 310 is operative to execute instructions 416 in order to carry out the functionality of autothrottle control system 300. FIG. 5 is a simplified block diagram illustrating portions of instructions 416 according to some examples. In operating autothrottle control system 300 via autothrottle mode input 312 or autothrottle TO-GA input 316 the pilot of aircraft 100 may select from among certain available programs which dictate the control algorithm of the autothrottle operation. Also, the operating state of the autothrottle is selectable via autothrottle mode input 312 and autothrottle activation input 314.

Instructions 416 include user-interface process 502, flight-safety oversight process 504, airspeed program 510, engine-thrust program 512, maximize endurance program 514, maximize airspeed program 516, and takeoff/go-around program 518. Each process or program comprises a set of instructions executable by autothrottle controller 310 for operating autothrottle control system 300. In general, each of programs 510-518 is executed individually (although one program may automatically transition to another program). However, user-interface process 502 and flight-safety oversight process 504 are continuously executed.

Figure 6:
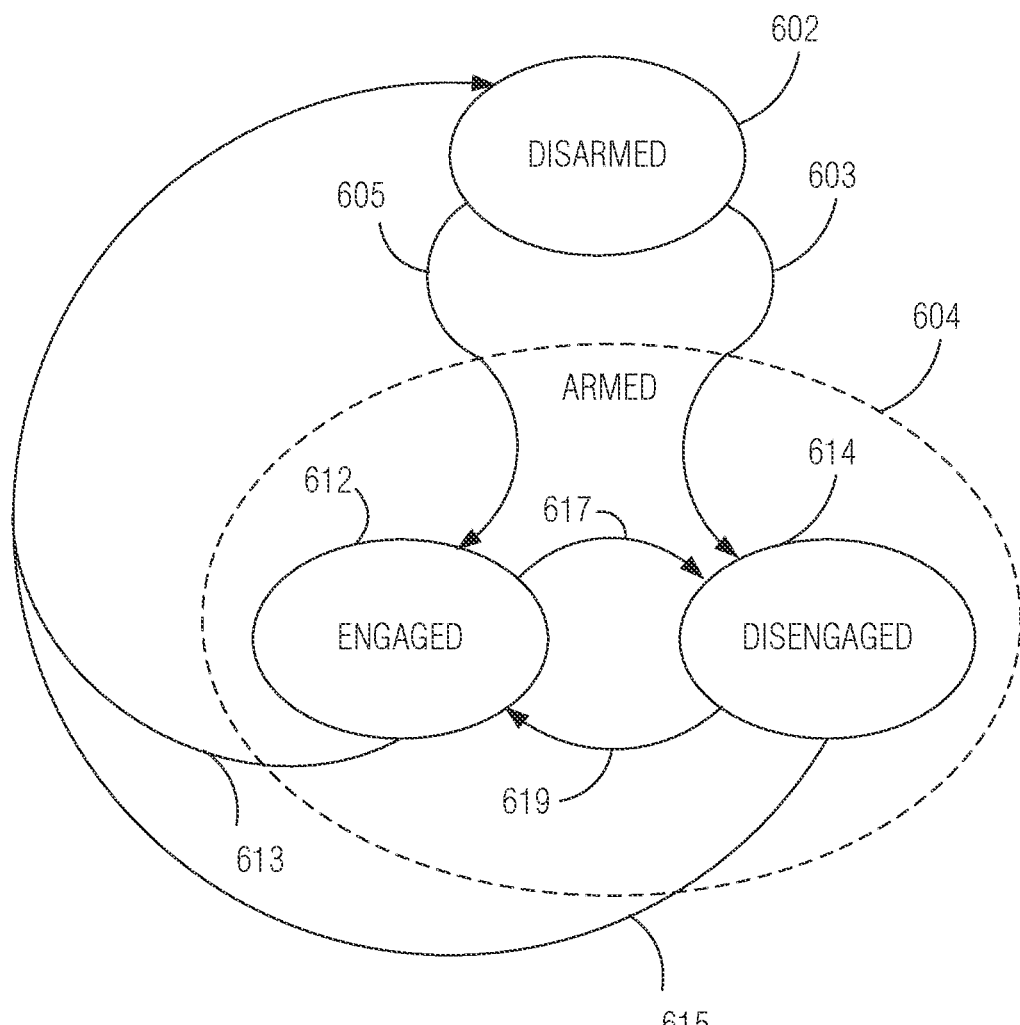
FIG. 6 is a state diagram illustrating some basic states of an autothrottle control system according to some embodiments.

User-interface process 502 is operative to monitor all user inputs (and, optionally, certain sensors) and set the autothrottle control system 300 into various states in response thereto. FIG. 6 is a state diagram illustrating some basic states, according to an example implementation. The basic states include disarmed state 602, and armed state 604. Armed state 604 comprises engaged state 612, and disengaged state 614. Autothrottle control system 300 transitions from disarmed state 602 into armed-disengaged state 614 via transition 603, and transitions from armed-disengaged state 614 back to disarmed state 602 via transition 615. Autothrottle control system 300 transitions from disarmed state 602 into armed-engaged state 612 via transition 605, and transitions from armed-engaged state 612 back to disarmed state 602 via transition 613. In the armed state, autothrottle control system 300 transitions between engaged state 612 and disengaged state 614 via transitions 617 and 619, as shown.

In disarmed state 602, the autothrottle control system 300 is generally inoperative. It may be completely inoperative in some embodiments or, in other embodiments, the autothrottle control system 300 may be minimally operative to monitor certain safety-related indicia, such as overspeed/underspeed, overtemp, overtorque, and may autonomously engage autopilot control in response to an unsafe condition in order to restore and maintain a safe flight envelope. In the armed states 604, the autothrottle control system 300 monitors the control inputs and determines the autothrottle control-target settings. In armed-disengaged state 614, the autothrottle control system 300 does not normally actuate PCL 202 in accordance with the control-target settings, although virtual detents may be set and adjusted. In armed-engaged state 612, the autothrottle control system 300 commands autothrottle actuator 304 to set and adjust PCL 202 in accordance with the control-target settings.

Table 1 below summarizes various operations of pilot inputs that are handled by user-interface process 502, according to an example implementation.

TABLE 1

| CONTROL INPUT | FUNCTIONALITY |
|---|---|
| AUTOTHROTTLE MODE SELECTOR 208 | Press and hold (>1 sec) to engage or disengage the autothrottle. Short press to toggle between THR-SPD mode (when engaged); or THR armed-SPD armed-OFF (when not engaged). |
| AUTOTHROTTLE ACTIVATION CONTROL 204 | Press and hold (>1 sec) to disengage the autothrottle completely. Short press to disconnect into the armed state, or re-engage from armed state. Double-press to toggle fine/coarse speed adjustment while armed. |
| TAKEOFF/GO AROUND CONTROL 206 | Press to activate Takeoff mode (on ground), or Go-Around mode (in air). |
| PCL 202 | Move to adjust the autothrottle control target (e.g., speed or torque) when the autothrottle is in the armed state. |

In one embodiment, autothrottle mode selector 208 is a button that is used to initially arm the autothrottle system and toggle between autothrottle modes. The modes are described in greater detail below and may include (without limitation):

| TO | - | Takeoff mode |
| CLB | - | Climb mode |
| CRZ | - | Cruise-max power mode |
| THR | - | Thrust-hold mode |
| GA | - | Go-around mode |
| ### | - | Set-speed control mode |
| OFF | - | Disengaged |

The mode selector 208 button, mounted on the instrument panel, may incorporate display 210 (e.g., a backlit-LCD or LED array on the button face) to display autothrottle mode and speed target values. Autothrottle modes may be displayed in a first color, e.g., white, when in the armed-disengaged state 614, and in a second color, e.g., green, when in the armed-engaged state 612.

Pressing the autothrottle mode selector 208 button while not in any armed state 604 arms the autothrottle. The autothrottle initially arms at the current torque or airspeed. Repeated presses of the autothrottle mode selector 208 button toggles between Thrust and Speed modes (Thrust armed, Speed armed, and Off if not engaged). Pressing and holding the autothrottle mode selector 208 button (for >1 sec) engages or disengages the autothrottle. The autothrottle can only be engaged from an armed state 604.

When the autothrottle system 300 is in an armed state 604, PCL 202 can be moved to adjust the autothrottle target torque or speed value.

Autothrottle activation control 204, in one embodiment, is a button is located on the right side of the PCL handle. Pressing the autothrottle activation control 204 button will place the autothrottle system 300 into armed-engaged state 612, or disconnect the autothrottle into the armed-disengaged state 614. Pressing the autothrottle activation control 204 button again will re-engage the (armed) autothrottle into state 612 to actively maintain the updated torque or speed target. Double-pressing the autothrottle activation control 204 button while in the armed-disengaged state 614 in the speed-control mode will toggle coarse or fine adjustment of the target speed. Pressing and holding the autothrottle activation control 204 button (>1 sec) will disengage the autothrottle completely returning to disarmed state 602.

In one embodiment, takeoff/go around control 206 is implemented as a button on the left side of the PCL handle. If the autothrottle system is in the armed-disengaged state 604 and the mode is set to Takeoff (TO) mode, activating the takeoff/go around control 206 button on the throttle handle will activate TO mode and PCL 202 will automatically advance to the maximum continuous thrust setting. When aircraft 100 is in the air, pressing the takeoff/go around control 206 button while the autothrottle is in either armed state 612, 614 will activate Go-Around (GO) mode and the PCL will automatically advance to maximum continuous thrust under the control of the autothrottle.

In some embodiments, behavior of the PCL is controlled in a specific manner by user-interface process 502 to set one or more variably-positionable virtual detents along the travel path of PCL 202. The virtual detents are thus implemented by autothrottle controller 310 and autothrottle actuator 304 to indicate an autothrottle control-target setting to the pilot through a haptic effect using PCL 202. A virtual detent may be effected by application of a force by autothrottle actuator 304 that opposes manual throttle input 302 at a set location along the travel path of PCL 202. The position of the virtual detent along the travel path of PCL 202 is variable by autothrottle controller 310. Likewise, the detent force may be variable by autothrottle controller 310. Multiple virtual detents of the same, or different, detent forces may be implemented at a given time along the travel path of PCL 202. As described in greater detail below, the virtual detents may be automatically varied by other processes, such as flight-safety oversight process 504, engine-thrust program 512, and others, to account for changes in operating conditions of aircraft 100. When a virtual detent position is autonomously moved by autothrottle controller 310 while the PCL is set at the virtual detent, the PCL 202 is moved to the revised detent position.

Figure 7:
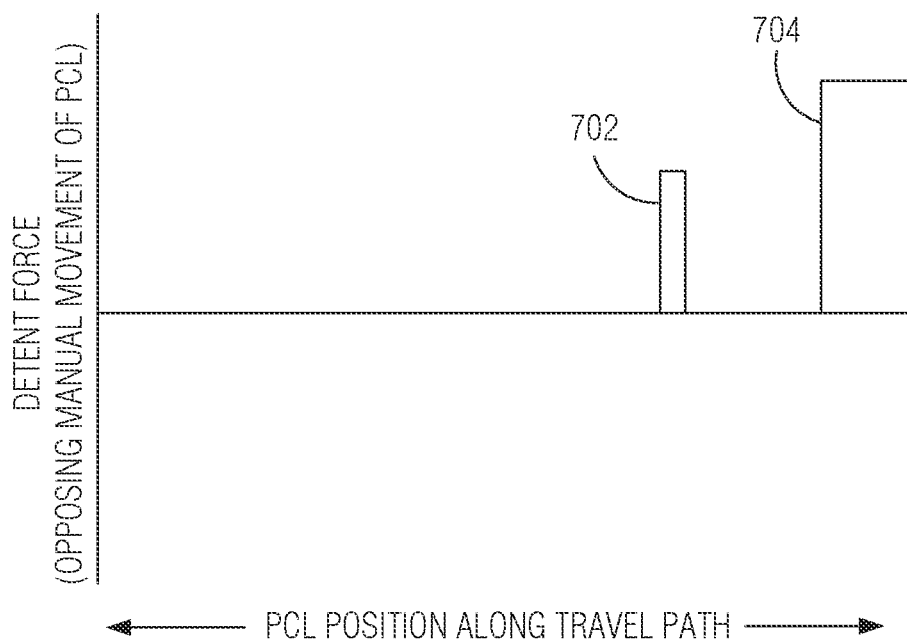
FIG. 7 is a diagram illustrating examples of virtual detent force at various positions along the travel path of a power control lever (PCL) according to some embodiments.

FIG. 7 is a diagram illustrating examples of virtual detent force at various positions along the travel path of the PCL. As depicted, a first virtual detent 702 is implemented as a force applied by the autothrottle system to oppose the motion of the PCL when the PCL is positioned at a portion along its travel path. A second virtual detent 704 is similarly implemented at another position. Notably, second virtual detent 704 has a higher detent force than virtual detent 702, and is applied over a greater (wider) range of the travel path. First virtual detent 702 may represent a virtual detent associated with a particular engine thrust setting, whereas second detent 704 may represent a safety-based limit of engine thrust.

Figure 8A:
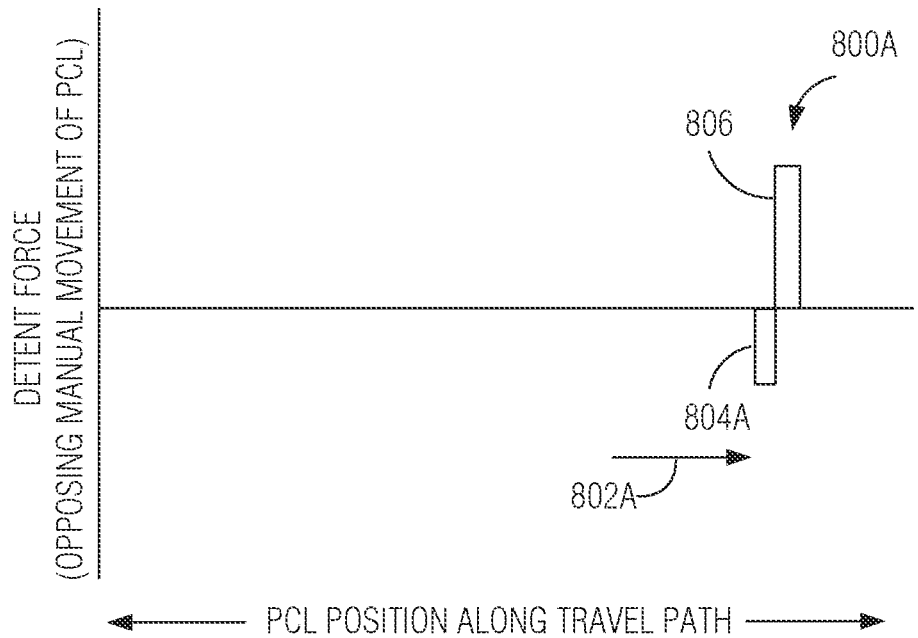
FIGS. 8A-8B illustrate another example of a virtual detent which is composed of a combination of oppositely-directed forces applied by the autothrottle system, according to additional embodiments.
Figure 8B:
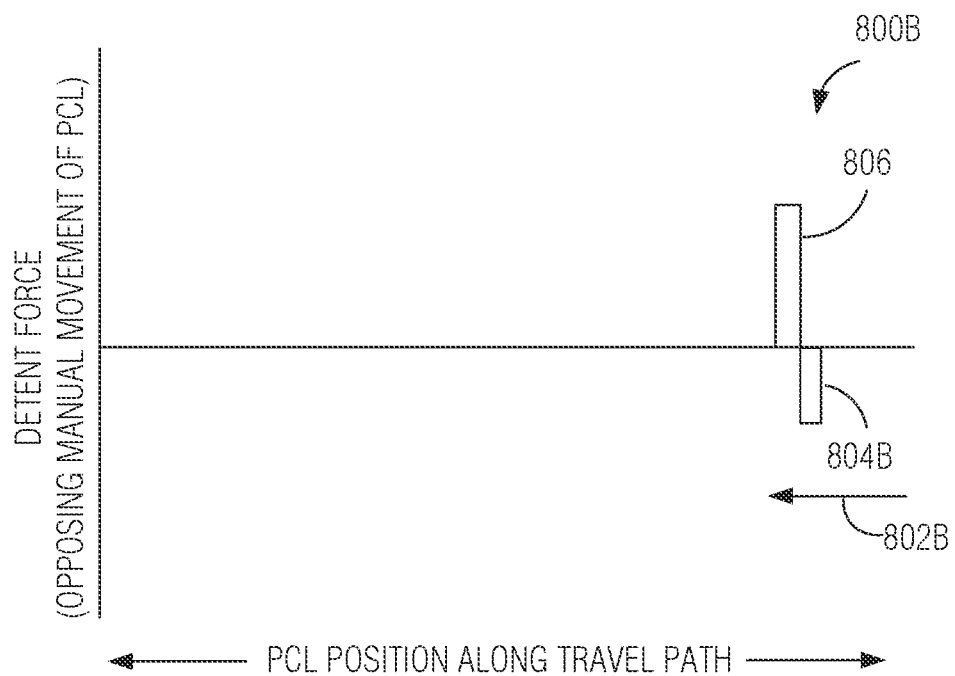

FIGS. 8A-8B illustrate another example of a virtual detent 800A, 800B which is composed of a combination of oppositely-directed forces applied by the autothrottle system to provide the haptic sensation of the PCL "falling into" a detent. Virtual detent 800A, 800B is implemented by autothrottle actuator 304 under the control of autothrottle controller 310, which also monitors the PCL position via throttle setting sensor 308. As illustrated in FIG. 8A, virtual detent 800A is composed of two opposite detent forces that are applied sequentially as the PCL is moved in first direction 802A along its travel path. Non-opposing detent force 804A is oriented in the direction of travel (i.e., assisting the movement of the PCL along direction 802A), whereas detent force 806 opposes any movement of the PCL. This combination of forces simulates the haptic sensation of a mechanical detent into which the PCL would be drawn. FIG. 8B illustrates the virtual detent 800B, which achieves the same PCL setting as virtual detent 800A, except that virtual detent 800B is implemented as the PCL moves toward its location in the opposite direction, 802B. As the PCL approaches the location of virtual detent 800B, non-opposing detent force 804B is applied along the direction of travel 802B, and then detent force 806 opposes the direction of travel. This example demonstrates that a virtual detent may be responsive to the direction of manual movement of the PCL.

User-interface process 502 facilitates various pilot interactions with the virtual detent(s). For instance, momentary actuation of autothrottle activation control 204 while the autothrottle is in the armed-engaged state 612 releases the virtual detent while transitioning the state to the armed-disengaged state 614, thus allowing movement of PCL 202 to a different position (which may or may not itself be another virtual detent). In a related embodiment, manual placement of PCL 202 at a position of a virtual detent (while autothrottle system 300 is in the armed-disengaged state 614) will cause the autothrottle to re-engage into armed-engaged state 612 (provided that the selected mode accommodates such engagement). As another provision by user-interface process 502, the pilot of aircraft 100 may set a new virtual detent by holding the autothrottle activation control 204 button while moving the PCL to a position that achieves the desired setting for torque, indicated air speed (IAS) or Mach number.

Turning again to FIG. 5, flight-safety oversight process 504 is operative to monitor the aircraft's sensors (e.g., engine temperature sensor 320, engine torque sensor 322, airspeed sensor 324, altimeter, etc.) and compare the present state of operation or performance, or the condition, of aircraft 100 to the predefined constraints of aircraft 100 and its engine(s), to ensure that the aircraft is being operated within its safe flight envelope. For instance, overspeed/ underspeed at the present altitude, temperature limit, torque limit, differential torque in multi-engine aircraft, and the like, may be monitored, and the autothrottle system's controls may be overridden to adjust the PCL setting so that the aircraft remains within safe operating conditions.

In related embodiments, flight-safety oversight process 504 may set or vary the position(s) of one or more virtual detents according to variations in altitude, engine temperature, or other measured conditions. For instance, if an engine temperature limit is being approached by the current measured temperature, a virtual detent may be added or moved to indicate a limit to the pilot when the autopilot system 300 is in the armed-disengaged state. In a related example, the virtual detent associated with a safety limit has a higher detent force (i.e., the force opposing pilot movement of the PCL) than a non-safety-related detent.

Airspeed program 510 causes the autothrottle to implement a basic fixed-airspeed control (set-speed control mode). Program 510 accepts pilot input to set a particular airspeed, which may be set via manual throttle input 302. Thereafter, airspeed program 510 operates autothrottle actuator 304 to increase engine power if the indicated airspeed drops below the set point, and to decrease engine power if the indicated airspeed rises above the set point. When the autothrottle is engaged in a set-speed control mode, the pilot may press the autothrottle activation control 204 button to release the autothrottle into armed-disengaged state 614 and move the throttle lever to select a new target speed (which may be displayed in white on display 210). After the target speed is selected, pressing the autothrottle activation control 204 button again re-activates the autothrottle to maintain the selected airspeed. In the armed-disengaged state 614, while in set-speed control mode, movements of the throttle lever may be translated to target speed changes rounded to 5-knot increments. Double-clicking the autothrottle activation control 204 button allows the target speed to be adjusted in (fine) 1-knot increments.

Engine-thrust program 512 executes the thrust hold mode (THR) to maintain the current engine torque. Program 512 may automatically reduce the torque to enforce the applicable power and temperature limits based on the current rate-of-climb. While the autothrottle is in the armed-engaged state 612 in THR mode, the pilot may press the autothrottle activation control 204 button to temporarily release the autothrottle into the armed-disengaged state 614, and manually move PCL 202 to select a new thrust setting. In armed-disengaged state 614, the PCL will move freely unless it engages to enforce safety limits (overtemp/overspeed/undertorque/underspeed) as per flight-safety oversight process 504. After adjusting torque, the autothrottle can be re-engaged by pressing the autothrottle activation control 204 button again to maintain the new torque.

In a related embodiment, while in the armed state, the autothrottle also sets a virtual detent at the maximum continuous thrust (MCT) setting. Additional virtual detents at other thrust settings may likewise be established. Such virtual detents make common torque settings easier to select by the pilot by stopping the PCL when the defined torque setting is reached. When virtual detents are set, the PCL will move freely until the detent is reached, at which point the PCL motion is opposed by a counteracting force associated with that virtual detent.

As discussed above, a virtual detent associated with a thrust setting in THR mode may be automatically moved in response to changing operational conditions. For instance, the torque limit may be adjusted as a function of density altitude.

Maximize endurance program 514 implements a dynamic airspeed control algorithm for determining and maintaining an efficient operating point for aircraft 100 such that the aircraft operates at or near its maximum lift-to-drag (L/D) ratio under the prevailing conditions, such as described in U.S. patent application Ser. No. 17/359,019, the disclosure of which is incorporated by reference herein.

Maximize airspeed program 516 implements a dynamic control algorithm of autothrottle system 300 for cruise operation that monitors the engine temperature (e.g., via engine temperature sensor 320) and adjusts the PCL setpoint to produce the maximum speed while maintaining the engine temperature at or near the applicable max-operating-temperature limit. Program 516 may set and adjust the position of a virtual detent at the dynamic PCL setpoint, allowing the pilot to vary the PCL position as desired, and to conveniently return the PCL to the temperature-limited maximum-speed control point.

Takeoff/go-around program 518 implements takeoff mode (TO), climb mode (CLB), cruise mode (CRZ), and go-around mode (GA), as well as the automatic transitions between these modes. TO is initiated while aircraft 100 is on the ground. According to takeoff program 518, autothrottle 300 advances the PCL to maintain maximum continuous torque (MCT). TO is armed by pressing the mode selector 208 button (while on the ground). Pressing the mode selector 208 button again will disarm TO.

With TO armed, the pilot may initiate the autothrottle takeoff by pressing the takeoff/go around control 206 button on the PCL handle, as described above. This causes the autothrottle 300 to engage and smoothly increase power to MCT, where a virtual detent is set. Alternately, the pilot may opt to manually advance the PCL until the autothrottle reaches the virtual-detent point and engages autothrottle control to maintain MCT. Under such control, the thrust will be maintained at MCT until it is manually or automatically reduced to climb power.

In accordance with takeoff/go-around program 518, TO transitions to climb mode (CLB) upon meeting the pre-defined mode-transition criteria. In one implementation, the mode-transition criteria includes a predefined time duration at MCT (e.g., 2-5 minutes). In another implementation, the mode-transition criteria for entering CLB is an altitude gain, which is measurable by an available barometric altimeter in aircraft 100 (e.g., an altitude increase of 400 feet from the altitude at which the TO was initiated). This approach uses readily-available altimetry data, rather than relying on a radar-based altimeter or other expensive instrumentation, which is not commonly found on many small aircraft.

In a related embodiment, the transition criteria for entering CLB includes manual reduction of PCL 202 by the pilot during TO (e.g., by actuating the autothrottle activation control 204 button to transition the autothrottle state to armed-disengaged state 614, reducing power by manually repositioning PCL 202, and then re-engaging the autothrottle to engaged state 612 by once again actuating activation control 204 button).

In climb mode (CLB), the autothrottle maintains MCT, but will reduce power automatically to enforce engine temperature limits. If the takeoff or climb is paused by levelling off (automatically detectable as a low rate of climb such as less than 200 feet per minute by monitoring the available altimeter), the autothrottle will transition to cruise mode (CRZ) and reduce power to the maximum cruise power setpoint, at which PCL location a virtual detent is set and adjusted as needed). If the climb is resumed while the autothrottle is still engaged in CRZ, climb power can be re-selected by the pilot by pressing the activation control 204 button to disengage the autothrottle into the armed-disengaged state 614 so that the PCL may be manually advanced in order to increase power until the virtual detent associated with MCT engages, thereby re-establishing CLB control.

In cruise mode (CRZ), the autothrottle controls the PCL to produce maximum cruise torque while enforcing engine temperature limits. A virtual detent is set (and adjusted as needed) at the corresponding PCL position.

Go-around mode (GA) is similar to TO, except that GA is activated while the autothrottle is either in the armed-engaged state 612, or armed-disengaged state 614, and when aircraft 100 is in the air. Under such conditions, GA is activated upon actuation of the takeoff/go around control 206 button by the pilot. Once activated, GA functions essentially in the same manner as TO, i.e., the autothrottle sets the PCL for MCT, sets a virtual detent accordingly, and maintains this setting until a condition is met to transition to climb mode (CLB) or cruise mode (CRZ).

ADDITIONAL NOTES AND EXAMPLES

Example 1 is a system for controlling an autothrottle of an aircraft that includes, a power-control input (PCL) manually movable by a pilot along a travel path to effect a throttle setting that controls engine power of the aircraft, the system comprising: an autothrottle controller including processing circuitry, memory, and input/output facilities, the autothrottle controller operative to execute instructions including a user-interface process and an autothrottle control program; an autothrottle actuator mechanically coupled to the PCL and operative to set and dynamically adjust the PCL in response to an output of the autothrottle controller; wherein the autothrottle control program, when executed, causes the autothrottle controller to determine a control-target setting and to command the autothrottle actuator to set and dynamically adjust the PCL according to the control-target setting when the system is in an engaged state for autothrottle control; and wherein the user-interface process, when executed, causes the autothrottle controller to set and dynamically adjust a virtual detent, the virtual detent being located at a position along the travel path of the PCL corresponding to the control-target setting, wherein the virtual detent is operative, at least when the system is in a disengaged state for autothrottle control, to indicate the control-target setting to the pilot via a haptic effect that applies a detent force opposing motion of the PCL in response to the PCL achieving the position of the virtual detent.

In Example 2, the subject matter of Example 1 includes, wherein the position of the virtual detent is dynamically variable by the autothrottle controller in response to adjustment of the control-target setting.

In Example 3, the subject matter of Examples 1-2 includes, wherein the user-interface process causes the autothrottle controller to read pilot input via a set of at least one input device, and to set an operational state from among a disarmed state, and a set of armed states that include the disengaged state and the engaged state, based on the pilot input; and wherein in the disengaged state, the autothrottle controller does not command the autothrottle actuator to move the PCL to achieve the control-target setting.

In Example 4, the subject matter of Examples 1-3 includes, wherein the autothrottle controller is operative to set a first instance of a virtual detent that applies a first detent force, and to set a second instance of a virtual detent that applies a second detent force that is different from the first detent force.

In Example 5, the subject matter of Examples 1-4 includes, wherein the autothrottle controller is operative to transition from the disengaged state to the engaged state for autothrottle control in response to the PCL being manually positioned at the position of the virtual detent.

In Example 6, the subject matter of Examples 1-5 includes, wherein the autothrottle controller is operative to read pilot input to reposition the virtual detent from a first position to a second position by manual movement of the PCL.

In Example 7, the subject matter of Examples 1-6 includes, wherein the autothrottle controller is operative to execute instructions including a flight-safety oversight process that causes the autothrottle controller to monitor one or more sensors and detect an unsafe operational condition, and to dynamically adjust the position of the virtual detent in response to a detected unsafe operational condition.

In Example 8, the subject matter of Examples 1-7 includes, an autothrottle activation input device operatively coupled to the autothrottle controller; an autothrottle mode input device operatively coupled to the autothrottle controller; and a display device operatively coupled to the autothrottle controller; wherein the user-interface process, when executed, causes the autothrottle controller to: respond to actuation of the autothrottle activation input device by toggling between the engaged and the disengaged states; respond to actuation of the autothrottle mode input device by switching between different ones of a plurality of autothrottle control modes; and display information indicative of a selected one of the plurality of autothrottle control modes on the display device.

In Example 9, the subject matter of Example 8 includes, wherein each of the autothrottle activation input device and the autothrottle mode input device comprises a pushbutton.

In Example 10, the subject matter of Examples 8-9 includes, wherein the autothrottle activation input device is situated on the PCL.

In Example 11, the subject matter of Examples 8-10 includes, wherein the autothrottle mode input device is integral with the display device.

In Example 12, the subject matter of Examples 8-11 includes, wherein the plurality of autothrottle control modes includes a takeoff mode, a climb mode, a thrust-hold mode, and a set-speed control mode.

In Example 13, the subject matter of Examples 8-12 includes, wherein at least one of the plurality of autothrottle control modes, when carried out by the autothrottle controller, causes the autothrottle controller to autonomously transition to another one of the autothrottle control modes.

In Example 14, the subject matter of Example 13 includes, wherein the autonomous transition from a first one of the plurality of autothrottle control modes to a second one of the plurality of autothrottle control modes is performed in response to a determination by the autothrottle controller that mode-transition criteria has been met.

In Example 15, the subject matter of Example 14 includes, wherein the first one of the plurality of autothrottle control modes is a takeoff mode in which maximum continuous torque (MCT) is maintained, and the second one of the plurality of autothrottle control modes is a climb mode in which MCT is maintained, subject to power reduction in response to an engine temperature limit.

In Example 16, the subject matter of Examples 14-15 includes, wherein the first one of the plurality of autothrottle control modes is a takeoff, go-around, or climb mode in which maximum continuous torque (MCT) is maintained as a control target, and the second one of the plurality of autothrottle control modes is a cruise mode in which a cruise torque that is lower than the MCT is maintained as the control target.

In Example 17, the subject matter of Examples 14-16 includes, wherein the mode-transition criteria includes a passage of a predefined time duration.

In Example 18, the subject matter of Examples 14-17 includes, wherein the mode-transition criteria includes a predefined altitude gain having been achieved.

In Example 19, the subject matter of Examples 14-18 includes, wherein the mode-transition criteria includes achieving level flight defined as an altitude gain of less a predefined threshold amount.

Example 20 is a system for controlling an autothrottle of an aircraft, the system comprising: an autothrottle controller including processing circuitry, memory, and input/output facilities, the autothrottle controller operative to execute instructions including a user-interface process and an autothrottle control program; an autothrottle actuator to set and dynamically adjust a throttle setting that controls engine power of the aircraft in response to an output of the autothrottle controller; an autothrottle activation input device operatively coupled to the autothrottle controller; an autothrottle mode input device operatively coupled to the autothrottle controller; and a display device operatively coupled to the autothrottle controller; wherein the autothrottle control program, when executed, causes the autothrottle controller to determine a control-target setting and to command the autothrottle actuator to set and dynamically adjust the throttle setting according to the control-target setting when the system is in an engaged state for autothrottle control; and wherein the user-interface process, when executed, causes the autothrottle controller to: respond to actuation of the autothrottle activation input device by toggling between the engaged and the disengaged states; respond to actuation of the autothrottle mode input device by switching between different ones of a plurality of autothrottle control modes; and display information indicative of a selected one of the plurality of autothrottle control modes on the display device.

In Example 21, the subject matter of Example 20 includes, wherein each of the autothrottle activation input device and the autothrottle mode input device comprises a pushbutton.

In Example 22, the subject matter of Examples 20-21 includes, wherein the autothrottle activation input device is situated on the PCL.

In Example 23, the subject matter of Examples 20-22 includes, wherein the autothrottle mode input device is integral with the display device.

Example 24 is a system for controlling an autothrottle of an aircraft, the system comprising: an autothrottle controller including processing circuitry, memory, and input/output facilities, the autothrottle controller operative to execute instructions including an autothrottle control program; an autothrottle actuator to set and dynamically adjust a throttle setting that controls engine power of the aircraft in response to an output of the autothrottle controller; wherein the autothrottle control program, when executed, causes the autothrottle controller to: command the autothrottle actuator to set and dynamically adjust the throttle setting according to different ones of a plurality of autothrottle control modes, wherein each of the autothrottle control modes defines a corresponding control-target setting; and autonomously transition from one of the autothrottle control modes to another one of the autothrottle control modes in response to a determination by the autothrottle controller that mode-transition criteria has been met.

In Example 25, the subject matter of Example 24 includes, wherein the plurality of autothrottle control modes includes a takeoff mode, a climb mode, a thrust-hold mode, and a set-speed control mode.

In Example 26, the subject matter of Examples 24-25 includes, wherein the first one of the plurality of autothrottle control modes is a takeoff mode in which maximum continuous torque (MCT) is maintained, and the second one of the plurality of autothrottle control modes is a climb mode in which MCT is maintained, subject to power reduction in response to an engine temperature limit.

In Example 27, the subject matter of Examples 24-26 includes, wherein the first one of the plurality of autothrottle control modes is a takeoff, go-around, or climb mode in which maximum continuous torque (MCT) is maintained as a control target, and the second one of the plurality of autothrottle control modes is a cruise mode in which a cruise torque that is lower than the MCT is maintained as the control target.

In Example 28, the subject matter of Examples 24-27 includes, wherein the mode-transition criteria includes a passage of a predefined time duration.

In Example 29, the subject matter of Examples 24-28 includes, wherein the mode-transition criteria includes a predefined altitude gain having been achieved.

In Example 30, the subject matter of Examples 24-29 includes, wherein the mode-transition criteria includes achieving level flight defined as an altitude gain of less a predefined threshold amount.

Example 31 is an automated method for controlling an autothrottle of an aircraft that includes, a power-control input (PCL) manually movable by a pilot along a travel path to effect a throttle setting that controls engine power of the aircraft, the method comprising: determining, by an autothrottle controller, a control-target setting for a throttle of the aircraft; dynamically adjusting the throttle according to the control-target setting, including moving the PCL to achieve the control-target setting when the autothrottle is in an engaged state for autothrottle control; and setting and dynamically adjusting a virtual detent, the virtual detent being located at a position along a travel path of the PCL corresponding to the control-target setting, wherein the virtual detent is operative, at least when the autothrottle is in a disengaged state for autothrottle control, to indicate the control-target setting to the pilot via a haptic effect that applies a detent force opposing motion of the PCL in response to the PCL achieving the position of the virtual detent.

In Example 32, the subject matter of Example 31 includes, dynamically varying the virtual detent position in response to adjustment of the control-target setting.

In Example 33, the subject matter of Examples 31-32 includes, reading pilot input via a set of at least one input device; and setting an operational state of the autothrottle from among a disarmed state, and a set of armed states that include the disengaged state and the engaged state, based on the pilot input, wherein in the disengaged state, the PCL is not moved to achieve the control-target setting.

In Example 34, the subject matter of Examples 31-33 includes, setting a first instance of a virtual detent that applies a first detent force, and setting a second instance of a virtual detent that applies a second detent force that is different from the first detent force.

In Example 35, the subject matter of Examples 31-34 includes, transitioning the autothrottle from the disengaged state to the engaged state in response to the PCL being manually positioned at the position of the virtual detent.

In Example 36, the subject matter of Examples 31-35 includes, reading pilot input to reposition the virtual detent from a first position to a second position by manual movement of the PCL.

In Example 37, the subject matter of Examples 31-36 includes, executing a flight-safety oversight process, including: monitoring one or more sensors and detecting an unsafe operational condition; and dynamically adjusting the position of the virtual detent in response to a detected unsafe operational condition.

In Example 38, the subject matter of Examples 31-37 includes, reading input from an autothrottle activation input device; reading input from an autothrottle mode input device; responding to actuation of the autothrottle activation input device by toggling between the engaged and the disengaged states; responding to actuation of the autothrottle mode input device by switching between different ones of a plurality of autothrottle control modes; and displaying information indicative of a selected one of the plurality of autothrottle control modes on a display device.

In Example 39, the subject matter of Example 38 includes, wherein the plurality of autothrottle control modes includes a takeoff mode, a climb mode, a thrust-hold mode, and a set-speed control mode.

In Example 40, the subject matter of Examples 38-39 includes, wherein at least one of the plurality of autothrottle control modes, when carried out, cause the autothrottle to autonomously transition to another one of the autothrottle control modes.

In Example 41, the subject matter of Example 40 includes, wherein the autonomous transition from a first one of the plurality of autothrottle control modes to a second one of the plurality of autothrottle control modes is performed in response to determining that mode-transition criteria has been met.

In Example 42, the subject matter of Example 41 includes, wherein the first one of the plurality of autothrottle control modes is a takeoff mode in which maximum continuous torque (MCT) is maintained, and the second one of the plurality of autothrottle control modes is a climb mode in which MCT is maintained, subject to power reduction in response to an engine temperature limit.

In Example 43, the subject matter of Examples 41-42 includes, wherein the first one of the plurality of autothrottle control modes is a takeoff, go-around, or climb mode in which maximum continuous torque (MCT) is maintained as a control target, and the second one of the plurality of autothrottle control modes is a cruise mode in which a cruise torque that is lower than the MCT is maintained as the control target.

In Example 44, the subject matter of Examples 41-43 includes, wherein the mode-transition criteria includes a passage of a predefined time duration.

In Example 45, the subject matter of Examples 41-44 includes, wherein the mode-transition criteria includes a predefined altitude gain having been achieved.

In Example 46, the subject matter of Examples 41-45 includes, wherein the mode-transition criteria includes achieving level flight defined as an altitude gain of less a predefined threshold amount.

Example 47 is a method for controlling an autothrottle of an aircraft, the method comprising: by an autothrottle controller: determining a control-target setting for a throttle of the aircraft; dynamically adjusting the throttle according to the control-target setting when the autothrottle is in an engaged state for autothrottle control; and reading input from an autothrottle activation input device; reading input from an autothrottle mode input device; responding to actuation of the autothrottle activation input device by toggling between the engaged and the disengaged states; and responding to actuation of the autothrottle mode input device by switching between different ones of a plurality of autothrottle control modes.

Example 48 is a method for controlling an autothrottle of an aircraft, the method comprising: autonomously, dynamically adjusting a throttle setting according to different ones of a plurality of autothrottle control modes, wherein each of the autothrottle control modes defines a corresponding control-target setting; and autonomously transitioning from one of the autothrottle control modes to another one of the autothrottle control modes in response to a determination by the autothrottle controller that mode-transition criteria has been met.

In Example 49, the subject matter of Example 48 includes, wherein the plurality of autothrottle control modes includes a takeoff mode, a climb mode, a thrust-hold mode, and a set-speed control mode.

In Example 50, the subject matter of Examples 48-49 includes, wherein the first one of the plurality of autothrottle control modes is a takeoff mode in which maximum continuous torque (MCT) is maintained, and the second one of the plurality of autothrottle control modes is a climb mode in which MCT is maintained, subject to power reduction in response to an engine temperature limit.

In Example 51, the subject matter of Examples 48-50 includes, wherein the first one of the plurality of autothrottle control modes is a takeoff, go-around, or climb mode in which maximum continuous torque (MCT) is maintained as a control target, and the second one of the plurality of autothrottle control modes is a cruise mode in which a cruise torque that is lower than the MCT is maintained as the control target.

In Example 52, the subject matter of Examples 48-51 includes, wherein the mode-transition criteria includes a passage of a predefined time duration.

In Example 53, the subject matter of Examples 48-52 includes, wherein the mode-transition criteria includes a predefined altitude gain having been achieved.

In Example 54, the subject matter of Examples 48-53 includes, wherein the mode-transition criteria includes achieving level flight defined as an altitude gain of less a predefined threshold amount.

Example 55 is at least one machine-readable medium including instructions that, when executed by processing circuitry, cause the processing circuitry to perform operations to implement of any of Examples 31-54.

Example 56 is an apparatus comprising means to implement of any of Examples 31-54.

The embodiments above are intended to be illustrative and not limiting. Additional embodiments are within each claim that does not expressly exclude such subject matter. In addition, although aspects of the present invention have been described with reference to particular embodiments, those skilled in the art will recognize that changes may be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents apply only to the incorporated subject matter, and not to any of the subject matter directly present herein.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A system for controlling an autothrottle of an aircraft that includes a power-control input (PCL) manually movable by a pilot along a travel path to effect a throttle setting that controls engine power of the aircraft, the system comprising:
    an autothrottle controller including processing circuitry, memory, and input/output facilities, the autothrottle controller operative to execute instructions including a user-interface process for monitoring pilot inputs and an autothrottle control program;
    an autothrottle actuator mechanically coupled to the PCL and operative to set and dynamically adjust the PCL in response to an output of the autothrottle controller;
    an autothrottle activation input device operatively coupled to the autothrottle controller;
    an autothrottle mode input device operatively coupled to the autothrottle controller; and
    a display device operatively coupled to the autothrottle controller;
    wherein the autothrottle control program, when executed, causes the autothrottle controller to determine a control-target setting and to command the autothrottle actuator to set and dynamically adjust the PCL according to the control-target setting when the system is in an engaged state for autothrottle control;
    wherein the user-interface process, in response to pilot input, causes the autothrottle controller to set and dynamically adjust a virtual detent, the virtual detent being located at a position along the travel path of the PCL corresponding to the control-target setting, wherein the virtual detent is operative, at least when the system is in a disengaged state for autothrottle control, to indicate the control-target setting to the pilot via a haptic effect that applies a detent force opposing motion of the PCL in response to the PCL achieving the position of the virtual detent; and
    wherein the user-interface process, when executed, causes the autothrottle controller to:
    respond to actuation of the autothrottle activation input device by toggling between the engaged and the disengaged states;
    respond to actuation of the autothrottle mode input device by switching between different ones of a plurality of autothrottle control modes; and
    display information indicative of a selected one of the plurality of autothrottle control modes on the display device.

2. The system of claim 1, wherein the position of the virtual detent is dynamically variable by the autothrottle controller in response to adjustment of the control-target setting.

3. The system of claim 1, wherein the user-interface process causes the autothrottle controller to:
    read the pilot input via a set of at least one input device;
    set an operational state from among a disarmed state, and a set of armed states that include the disengaged state and the engaged state, based on the pilot input; and
    wherein in the disengaged state, the autothrottle controller does not command the autothrottle actuator to move the PCL to achieve the control-target setting.

4. The system of claim 1, wherein the autothrottle controller is operative to set a first instance of the virtual detent that applies a first detent force, and to set a second instance of a virtual detent that applies a second detent force that is different from the first detent force.

5. The system of claim 1, wherein the autothrottle controller is operative to transition from the disengaged state to the engaged state for autothrottle control in response to the PCL being manually positioned at the position of the virtual detent.

6. The system of claim 1, wherein the autothrottle controller is operative to read pilot input to reposition the virtual detent from a first position to a second position by manual movement of the PCL.

7. The system of claim 1, wherein the autothrottle controller is operative to execute instructions including a flight-safety oversight process that causes the autothrottle controller to monitor one or more sensors and detect an unsafe operational condition, and to dynamically adjust the position of the virtual detent in response to the detected unsafe operational condition.

8. The system of claim 1, wherein each of the autothrottle activation input device and the autothrottle mode input device comprises a pushbutton.

9. The system of claim 1, wherein the autothrottle activation input device is situated on the PCL.

10. The system of claim 1, wherein the autothrottle mode input device is integral with the display device.

11. The system of claim 1, wherein the plurality of autothrottle control modes includes a takeoff mode, a climb mode, a thrust-hold mode, and a set-speed control mode.

12. The system of claim 1, wherein at least one of the plurality of autothrottle control modes, when carried out by the autothrottle controller, causes the autothrottle controller to autonomously transition to another one of the autothrottle control modes.

13. The system of claim 12, wherein the autonomous transition from a first one of the plurality of autothrottle control modes to a second one of the plurality of autothrottle control modes is performed in response to a determination by the autothrottle controller that mode-transition criteria has been met.

14. The system of claim 13, wherein the first one of the plurality of autothrottle control modes is a takeoff mode in which maximum continuous torque (MCT) is maintained, and the second one of the plurality of autothrottle control modes is a climb mode in which MCT is maintained, subject to power reduction in response to an engine temperature limit.

15. The system of claim 13, wherein the first one of the plurality of autothrottle control modes is a takeoff, go-around, or climb mode in which maximum continuous torque (MCT) is maintained as a control target, and the second one of the plurality of autothrottle control modes is a cruise mode in which a cruise torque that is lower than the MCT is maintained as the control target.

16. The system of claim 13, wherein the mode-transition criteria includes a passage of a predefined time duration.

17. The system of claim 13, wherein the mode-transition criteria includes a predefined altitude gain having been achieved.

18. The system of claim 13, wherein the mode-transition criteria includes achieving level flight defined as an altitude gain of less a predefined threshold amount.

19. An automated method for controlling an autothrottle of an aircraft that includes a power-control input (PCL) manually movable by a pilot along a travel path to effect a throttle setting that controls engine power of the aircraft, the method comprising:
   determining, by an autothrottle controller, a control-target setting for a throttle of the aircraft;
   dynamically adjusting the throttle according to the control-target setting, including moving the PCL to achieve the control-target setting when the autothrottle is in an engaged state for autothrottle control;
   setting and dynamically adjusting a virtual detent in response to pilot input, the virtual detent being located at a position along a travel path of the PCL corresponding to the control-target setting, wherein the virtual detent is operative, at least when the autothrottle is in a disengaged state for autothrottle control, to indicate the control-target setting to the pilot via a haptic effect that applies a detent force opposing motion of the PCL in response to the PCL achieving the position of the virtual detent;
   reading input from an autothrottle activation input device;
   reading input from an autothrottle mode input device;
   responding to actuation of the autothrottle activation input device by toggling between the engaged and the disengaged states;
   responding to actuation of the autothrottle mode input device by switching between different ones of a plurality of autothrottle control modes; and
   displaying information indicative of a selected one of the plurality of autothrottle control modes on a display device;
   wherein at least one of the plurality of autothrottle control modes, when carried out, cause the autothrottle to autonomously transition to another one of the autothrottle control modes; and
   wherein the autonomous transition from a first one of the plurality of autothrottle control modes to a second one of the plurality of autothrottle control modes is performed in response to determining that mode-transition criteria has been met.

20. The method of claim 19, further comprising:
   dynamically varying the virtual detent position in response to adjustment of the control-target setting;
   reading pilot input via a set of at least one input device;
   setting an operational state of the autothrottle from among a disarmed state, and a set of armed states that include the disengaged state and the engaged state, based on the pilot input, wherein in the disengaged state, the PCL is not moved to achieve the control-target setting;
   setting a first instance of the virtual detent that applies a first detent force, and setting a second instance of a virtual detent that applies a second detent force that is different from the first detent force;
   transitioning the autothrottle from the disengaged state to the engaged state in response to the PCL being manually positioned at the position of the virtual detent; and
   reading pilot input to reposition the virtual detent from a first position to a second position by manual movement of the PCL.

21. The method of claim 19, further comprising:
   executing a flight-safety oversight process, including:
      monitoring one or more sensors and detecting an unsafe operational condition; and
      dynamically adjusting the position of the virtual detent in response to the detected unsafe operational condition.

* * * * *